United States Patent [19]

Smith

[11] 4,136,813
[45] Jan. 30, 1979

[54] JOINING A PAIR OF PARTS
[75] Inventor: Norman F. Smith, Solihull, England
[73] Assignee: Lucas Industries Limited, Birmingham, England
[21] Appl. No.: 782,257
[22] Filed: Mar. 28, 1977
[30] Foreign Application Priority Data
  Apr. 6, 1976 [GB] United Kingdom ............... 13815/76
[51] Int. Cl.² ............................................. B23K 31/02
[52] U.S. Cl. ................................... 228/224; 228/238; 228/263
[58] Field of Search ................ 228/204, 207–211, 228/219, 214, 215, 216, 224, 223, 238, 246, 263

[56] References Cited
U.S. PATENT DOCUMENTS

| | | | |
|---|---|---|---|
| 1,722,025 | 7/1929 | Wagener | 228/219 UX |
| 2,333,622 | 11/1943 | McNab | 228/219 X |
| 2,987,808 | 6/1961 | Benham | 228/207 |
| 3,111,746 | 11/1963 | Borg | 228/246 X |
| 3,471,921 | 10/1969 | Feenstra | 228/219 |
| 3,740,831 | 6/1973 | Jordan | 228/223 |
| 3,778,883 | 12/1973 | Bethsold | 228/223 X |
| 3,894,674 | 7/1975 | Weill | 228/207 X |

Primary Examiner—Donald G. Kelly
Attorney, Agent, or Firm—Ladas, Parry, Von Gehr, Goldsmith & Deschamps

[57] ABSTRACT

In a method of joining a pair of parts, wherein one of the parts is formed of a carbon-containing material and the other formed of a metal at least at its surface to be joined to said one part, the parts are first assembled with the surfaces to be joined in the required joining position, with a brazing material and a flux being provided at or adjacent the surfaces to be joined. The flux is chosen so that when raised to an elevated temperature above the melting point of the brazing material, it is capable of reacting with oxides and carbon at the surface of said one part, while the brazing material is chosen so as to be capable of being heated to said elevated temperature without decomposition. The assembly is then heated at least to said elevated temperature in a non-oxidizing atmosphere so as to melt the brazing material and cause the flux to react with surface oxides and carbon on said one part whereby, on cooling, a brazed joint is produced between the parts.

16 Claims, 1 Drawing Figure

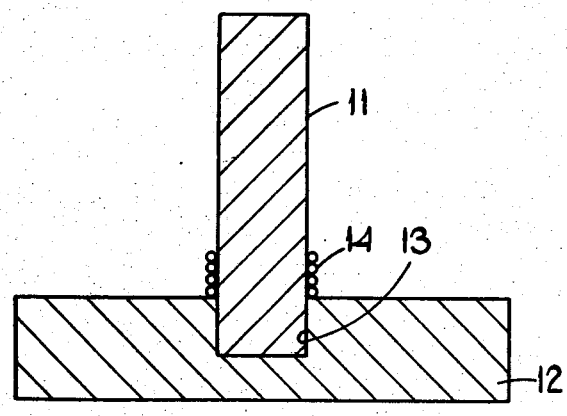

JOINING A PAIR OF PARTS

This invention relates to joining a pair of parts.

In one aspect, the invention resides in a method of joining a pair of parts wherein:

(a) the parts are assembled with the surfaces to be joined in the required joining position, one of the parts being formed of a material containing free carbon, i.e. carbon that is not in combined form and the other part being formed of a metal at least at its surface to be joined to said one part.

(b) a brazing material and a flux are provided at or adjacent said surfaces to be joined, the flux when raised to an elevated temperature above the melting point of the brazing material, being capable of reacting with oxides and carbon at the surface of said one part, and the brazing material being capable of being heated to said elevated temperature without decomposition, and (c) the assembly is heated at least to said elevated temperature in a non-oxidizing atmosphere so as to melt the brazing material and cause the flux to react with surface oxides and carbon on said one part whereby, on cooling, a brazed joint is produced between the parts.

Preferably, the brazing material has a sharply defined melting point.

Most preferably the brazing material is a eutectic alloy.

Conveniently, the brazing material in solid form is provided adjacent the surfaces to be joined and, during (c), melts and flows by capillary action between said surfaces.

Conveniently, the one part is cast iron or is a sintered mixture of carbon and at least one metal.

Conveniently, said metal of the other part is copper or nickel.

Preferably, said one part is a cast iron body having a bore therein and the other part is a copper rod which is inserted in said bore.

Conveniently, the brazing material is a gold/palladium alloy or a silver/copper alloy.

Preferably, the reactive component of the flux is titanium, or zirconium.

Preferably, the flux is titanium hydride or titanium metal.

Preferably, said atmosphere is free of nitrogen and hydrogen.

The accompanying drawing is a sectional view illustrating a method according to a first example of the invention.

Referring to the drawings, in the example shown it was required to produce a joint of good thermal conductivity between a 1" diameter copper rod 11 and a cast iron block 12. To produce the required joint, the block 12 was first subjected to a boring operation so as to form a ½" deep blind bore 13 having a substantially flat base extending generally perpendicular to the cylindrical wall of the bore. The bore 13 was intended to receive one end of the rod 11 and was arranged so that, at room temperature, an annular clearance of 0.006" existed between the rod and the cylindrical wall of the bore 13.

When the boring operation was complete, said one end of the rod 11 and the walls of the bore 13 were coated with a suspension of titanium hydride in sufficient methanol to give the suspension a creamy consistency. Said one end of the rod 11 was then inserted into the bore 13, and, after removal of any excess titanium hydride suspension, four brazing rings 14 were pushed over the free end of the rod 11 and pressed down onto the block 12. Each ring 14 was formed of a silver/copper eutectic alloy brazing wire having a diameter of 0.03" and was arranged so as to fit around the rod 11. As an alternative, the brazing rings could have been formed of a gold/palladium alloy, although these would of course have been more expensive.

When the above assembly was complete, it was allowed to stand for about 1 hour to allow the methanol to evaporate and was then heated to 950° C. in an atmosphere of pure argon, it being appreciated that the silver/copper brazing alloy had a sharply defined melting point of 782° C. and that the titanium hydride flux had an actuation temperature of about 900° C. The assembly was maintained at 950° C. for about 15 minutes to allow equilibrium conditions to be reached and at this temperature the titanium hydride flux removed surface oxides and carbon from the wall of the bore 13. Moreover, at this temperature the brazing alloy of the rings 14 was molten and so flowed by capillary action between the rod 11 and the wall of the bore 13. Thereafter the assembly was allowed to cool to room temperature in the presence of the protective argon atmosphere and, when the assembly was subsequently inspected, it was found that a brazed joint of good thermal conductivity existed between the rod 11 and the block 12. It is believed that the flux operated by initially decomposing to titanium metal which then reacted with surface oxides and carbon firstly to produce titanium dioxide, which dissolved in the molten brazing alloy, and secondly to produce at the wall of the bore 13 a titanium carbide coating, on which further titanium metal deposited to provide a suitable surface for wetting by the brazing material.

In a second example (not shown), it was required to join a first component formed of a sintered mixture of carbon with approximately 30% by weight of copper and 20% by weight of lead to a second, stainless steel component provided with a 5 micron thick nickel plated coating. To effect the required joint, the components were initially coated with a suspension of titanium hydride in glycerol and then the silver/copper eutectic alloy employed in the previous example was introduced between the surfaces to be joined. The assembly was then heated in a non-oxidizing, nitrogen and hydrogen-free atmosphere such as argon to a temperature between 940° and 960° C., preferably 950° C. As before, the titanium hydride flux removed surface oxides and carbon from the first component so that the brazing material was able to produce a satisfactory joint between the components.

In a third example, the components of the second example were joined satisfactorily when the brazing material was in the form of a rod of a silver/copper eutectic alloy having a core of titanium metal as the flux. The titanium content of the brazing rod was 5% or more preferably 10%, by weight and the brazing operation was again performed in an argon atmosphere at 950° C.

In a fourth example, it was required to join an electrical lead formed of oxygen free, high conductivity copper to a sintered brush for a dynamo electric machine, the brush consisting approximately of 40% by weight of carbon, 40% by weight of copper and 20% by weight of lead as lead dioxide. In this case, the required brazing and flux materials were provided by mixing five parts by weight of fine titanium powder (less than 45 micron particle size) as the flux with 35 parts by weight of lead, 42 parts by weight of silver and 18 parts by weight of copper, it being appreciated that the silver and the copper were present in the mixture in the proportions of a eutectic brazing alloy. The resultant mixture was cold pressed at 25 t.s.i. into a 0.033" thick preform, which was then provided at the joint area between the lead and the brush. The resultant assembly was then heated at 860° C. for 5 minutes in an argon atmosphere and, on cooling, a brazed joint of low electrical resistance was produced between the parts.

I claim:

1. A method of joining a pair of parts, wherein:
   (a) the parts are assembled with the surfaces to be joined in the required joining position, one of the parts being formed of a material containing free carbon and the other part being formed of a metal at least at its surface to be joined to said one part,
   (b) a brazing material and a flux are provided at or adjacent said surfaces to be joined, the flux when raised to an elevated temperature above the melting point of the brazing material, being capable of reacting with oxides and carbon at the surface of said one part, and the brazing material being capable of being heated to said elevated temperature without decomposition, and
   (c) the assembly is heated at least to said elevated temperature in a non-oxidizing atmosphere so as to melt the brazing material and cause the flux to react with surface oxides and carbon on said one part whereby, on cooling, a brazed joint is produced between the parts.

2. A method as claimed in claim 1, wherein the brazing material has a sharply defined melting point.

3. A method as claimed in claim 2, wherein the brazing is a eutectic alloy.

4. A method as claimed in claim 1, wherein the brazing material in solid form is provided adjacent the surfaces to be joined and, during (c), melts and flows by capillary action between said surfaces.

5. A method as claimed in claim 3, wherein the brazing material is a gold/palladium alloy.

6. A method as claimed in claim 1, wherein the one part is cast iron.

7. A method as claimed in claim 1, wherein said metal of the other part is copper.

8. A method as claimed in claim 1, wherein said one part is a cast iron body having a bore therein and the other part is a copper rod which is inserted in such bore.

9. A method as claimed in claim 1, wherein the reactive component of the flux is titanium.

10. A method as claimed in claim 9, wherein the flux is titanium hydride.

11. A method as claimed in claim 1, wherein said atmosphere is free from nitrogen and hydrogen.

12. A method as claimed in claim 3, wherein the brazing material is a silver/copper alloy.

13. A method as claimed in claim 1, wherein the one part is a sintered mixture of carbon and at least one metal.

14. A method as claimed in claim 1, wherein said metal of the other part is nickel.

15. A method as claimed in claim 1, wherein the reactive component of the flux is zirconium.

16. A method as claimed in claim 9, wherein the flux is titanium metal.

* * * * *